2,730,148
Patented Jan. 10, 1956

2,730,148

METHOD OF TREATING VEGETABLE MATERIAL

Carlo Matarrese, Flushing, N. Y.

No Drawing. Application October 18, 1954,
Serial No. 463,053

5 Claims. (Cl. 146—222)

This invention relates to a method of treating various vegetable materials, and is a continuation-in-part of the inventions disclosed in my application Serial No. 602,492, filed June 30, 1945, now Patent No. 2,483,472, granted October 4, 1949, and my application Serial No. 79,384, filed March 3, 1949, for Combination Food Grinding, now Patent No. 2,691,997, granted October 19, 1954.

An object of the invention is to provide a method for treating various kinds of vegetable materials, including the leaves, bark and roots of said materials so as to separate the solid matter from the liquid matter. The method includes the separation of the pulp from the juice or the pits or seeds from the pulp or the juice of various fruits and vegetables; the extraction of liquid nicotine from green leaf tobacco, the separation of the juice or liquids from various flowers, such as rose and carnation leaves; or the grinding of the pits of various fruits and vegetables while at the same time separating the pits from the pulp and skins of the fruits or vegetables during grinding.

Another object of the invention is to provide a method for treating various vegetable materials which includes the step of varying the treatment of said materials whereby to obtain different products.

An additional object includes the step of simultaneously performing a grinding and/or grating and/or pulverizing of the materials being treated.

An additional object is to provide a treatment of materials whereby only the juice and the finely pulverized material may be received, with the pulp or solid material being separated therefrom.

An additional object is to provide a method wherein the pits of fruits, such as olives or cherries, may be ground and separated from the pulverized pulp and skins, if any.

Other objects will be disclosed hereinafter throughout the specification.

As indicated above, the present method includes the employment of the machines of my Patent 2,483,472 and my Patent No. 2,691,997, above noted.

It has been determined that by employing the present method in the treatment of green leaves, a larger percentage of liquid extract may be obtained than from any other known process or apparatus. The process, therefore, as applied to green leaves of all kinds, separates the juice from the fibrous or leafy material, which latter may be ground to any degree of fineness.

Products which may be treated by my improved process include green tobacco leaves, coffee beans, meats, cheese, vegetables of all types, various roots, bark, and the leaves of various other plants and trees.

In treating olives to obtain olive oil, the olives are placed in the machine of my invention as disclosed in Patent No. 2,483,472 or my Patent No. 2,691,997 above identified. A door, preferably a sliding door such as shown in my Patent No. 2,483,472, is adjusted so as to be of just the proper size to permit the pits to pass therethrough. Both the pits and the grated material pass through the same slot.

A combined, grinding, grating, or shredding operation may be performed by utilizing teeth such as shown in Figures 6-13 of my application Serial No. 79,384. It is very important that the material be subjected to teeth of this type which are arranged in at least one spiral, as shown in Figures 6 and 11. The points of the teeth perform the grating operation. The inclined edges of the teeth shred the material. Only the teeth adjacent the periphery of the rotating tool perform the pulverizing operation. Pulverizing takes place when the opening, such as the opening 38 in my Patent 2,483,472 or the opening 100 in my Patent No. 2,691,997 have been entirely closed by the doors 62 and 101 respectively. When these doors have been entirely closed, the material finds its way past the periphery of the grinding tool and out of the opening which is closed by the plug 9 (the said plug having been removed) of my Patent 2,483,472, or out of the opening which is behind the grinding face, as shown in my Patent No. 2,691,997. The fan blades on the backs of the rotary tools in both instances assist in the movement of the pulverizing material and any liquids which have been extracted through the said opening.

It will be understood that the pulverizing step takes place only when, as indicated above, the pivoted or sliding doors in front of the rotary tool have been closed or substantially closed, i. e., the exit doors.

Various other fruits may be similarly treated.

In the treatment of all undried leafy products such as the petals of roses and carnations and the leaves of tobacco, the process includes the following: The leaves as they come from the plant, and without any preliminary treatment, are placed in either machine, and all openings in front of the combined shredder, grinder and pulverizer are closed. I prefer to use the grinding face such as shown in my Patent No. 2,691,997. However, the lower door, such as 101 in my said Patent No. 2,691,997, may be slightly opened in order that the operation may be a continuous one. Upon the starting of the machine, the material is ground, grated and shredded, and finally pulverized, according to the amount of opening as adjusted by the door 101. If the door is left open, a larger amount of fibrous material will be of coarser texture, and the juice will flow between the periphery of the grinder and the inside circular wall of the casing to the opening behind the grinder, where it is caught by a suitable receptacle placed beneath said opening.

In any of the previous processes, and as part of the present invention, I contemplate attaching to the first machine a second machine whereby to repeat the operation by performing the same steps in a second machine, thereby simultaneously subjecting the material which has been in the first machine to a second series of steps the same as performed in the first machine. The second machine will eliminate the step of pressing the material from the first machine.

The above description discloses several embodiments of the invention, and specific language has been employed. It will, nevertheless, be understood that no limitations of the scope of the invention are thereby contemplated, and that various alterations and modifications may be made such as would occur to one skilled in the art to which the invention relates, except as set forth in the claims.

I claim:

1. The process of reducing vegetable material in large pieces to a finely divided state which comprises confining one or more of said large pieces only in a defined area, repeatedly chipping particles of various sizes from the outer surface portions of said large pieces at a peripheral portion of said area, retaining the larger of those pieces thus chipped in said area and removing the smaller particles only of those thus chipped from said area, the said smaller particles being removed from said area at a peripheral portion of said area spaced from that at which said chipping action takes place.

2. The process of claim 1, which includes confining the said one or more larger pieces within a cylindrical area.

3. The process of claim 1, which includes chipping from an end portion of said area.

4. The process of claim 1, which includes removing the small particles from a side portion of said area.

5. The process of claim 1 which includes the step of creating a current of air to assist in separating the smaller from the larger particles.

References Cited in the file of this patent

UNITED STATES PATENTS

| | | |
|---|---|---|
| 802,487 | Wimmer | Oct. 24, 1905 |
| 940,181 | Montag | Nov. 16, 1909 |
| 1,568,316 | Buensod | Jan. 5, 1926 |
| 2,044,564 | Carter | June 16, 1936 |
| 2,478,473 | Eskew | Aug. 9, 1949 |
| 2,483,472 | Matarrese | Oct. 4, 1949 |
| 2,567,362 | Berkman et al | Sept. 11, 1951 |
| 2,691,997 | Matarrese | Oct. 19, 1954 |

FOREIGN PATENTS

| | | |
|---|---|---|
| 26,234 | Great Britain | 1911 |